(12) United States Patent
Friehauf

(10) Patent No.: US 10,803,764 B2
(45) Date of Patent: Oct. 13, 2020

(54) METHODS AND SYSTEMS FOR TEACHING PLAYBOOK CONTENT AND TESTING KNOWLEDGE OF THE SAME

(71) Applicant: Chad Friehauf, Brush, CO (US)

(72) Inventor: Chad Friehauf, Brush, CO (US)

( * ) Notice: Subject to any disclaimer, the term of this patent is extended or adjusted under 35 U.S.C. 154(b) by 484 days.

(21) Appl. No.: 14/296,725

(22) Filed: Jun. 5, 2014

(65) Prior Publication Data
US 2014/0370486 A1 Dec. 18, 2014

Related U.S. Application Data

(60) Provisional application No. 61/834,785, filed on Jun. 13, 2013.

(51) Int. Cl.
| G09B 7/00 | (2006.01) |
| G09B 5/08 | (2006.01) |
| G09B 5/10 | (2006.01) |
| G09B 7/02 | (2006.01) |
| G09B 7/04 | (2006.01) |

(52) U.S. Cl.
CPC .............. *G09B 7/00* (2013.01); *G09B 5/08* (2013.01); *G09B 5/10* (2013.01); *G09B 7/02* (2013.01); *G09B 7/04* (2013.01)

(58) Field of Classification Search
CPC ... A63B 69/00; A63B 69/002; A63B 69/0071; A63B 2024/0081; G09B 5/00; G09B 5/02; G09B 5/04; G09B 5/06; G09B 5/08; G09B 5/10; G09B 5/12; G09B 5/14; G09B 7/00; G09B 7/02; G09B 7/04; G09B 7/06; G09B 7/07; G09B 7/08; G09B 7/10; G09B 7/12; G09B 9/00; G09B 19/00; G09B 19/003; G09B 19/0038

See application file for complete search history.

(56) References Cited

U.S. PATENT DOCUMENTS

| 2006/0247808 A1* | 11/2006 | Robb ................. A63B 24/0021 700/91 |
| 2012/0122061 A1* | 5/2012 | Dohring ................... G09B 7/04 434/157 |
| 2013/0139068 A1* | 5/2013 | Bowring ............ A63B 71/0616 715/747 |

* cited by examiner

*Primary Examiner* — Robert J Utama
(74) *Attorney, Agent, or Firm* — Sheridan Ross P.C.

(57) ABSTRACT

Systems and methods for testing an individual's knowledge or group knowledge are disclosed. Specifically, the testing systems and methods disclosed herein are configured to test and teach playbook skills, such as a football playbook. The testing and teaching system and methods disclosed herein enable a learning progression that helps with retention of the playbook contents.

20 Claims, 8 Drawing Sheets

METHODS AND SYSTEMS FOR TEACHING PLAYBOOK CONTENT AND TESTING KNOWLEDGE OF THE SAME

CROSS REFERENCE TO RELATED APPLICATION

The present application claims the benefit of and priority, under 35 U.S.C. § 119(e), to U.S. Provisional Application Ser. No. 61/834,785, filed on Jun. 13, 2013, entitled "Methods and Systems for Teaching Playbook Content and Testing Knowledge of the Same," and Exhibit A are incorporated herein by reference, in their entirety, for all that they teach and for all purposes.

FIELD OF THE DISCLOSURE

The disclosure relates to teaching and testing paradigms and more specifically to teaching playbook content and testing knowledge of a playbook, such as a football playbook.

BACKGROUND

Football has long been considered a "gladiator sport" where collisions of epic proportions occur and where legends are covered in mud. However, those involved in football on a day-to-day basis understand the intricacies behind the game and the strategy involved. In fact, every football team from the pee-wee leagues to the National Football League (NFL) is always looking for strategic advantages. One such advantage can be obtained through innovative play designs which help achieve desired personnel matchups.

One example of a fundamental change in football strategy came with the advent of the "West Coast Offense." Many teams have successfully implemented this highly complex offense. The term "West Coast Offense" is more of a philosophy and an approach to the game of football than it is a set of plays or formations. Traditional offensive thinking argues that a team must establish its running game first, which will draw the defense in and open up vertical passing lanes downfield (i.e., passing lanes that run perpendicular to the line of scrimmage).

Bill Walsh's West Coast Offense differs from traditional offense by emphasizing a short, horizontal passing attack to help stretch the defense out, thus opening up options for longer running plays and longer passes that can achieve greater gains. The West Coast Offense as implemented under Walsh features precisely run pass patterns by the receivers that make up about 65% to 80% of the offensive scheme. With the defense stretched out, the offense is then free to focus the remaining plays on longer throws of more than 14 yards and mid to long yard rushes.

One down-side to the West Coast Offense (and most other pro-style offenses) is that they are relatively complicated and have a significant amount of terminology associated therewith. This complexity and terminology presents a significant learning curve to any new-corner to an offense, regardless of whether or not the new corner is a 10-year veteran or a rookie.

Most football coaches have the "sink or swim" mentality when it comes to learning a playbook. Either the player will learn the playbook or they will be replaced by a player who is capable of learning the playbook. What is lacking is a teaching and testing tool that is specifically designed to help current-day athletes learn the intricacies of the playbook in an expedited fashion and to help coaches assess the knowledge of their players.

SUMMARY

Embodiments of the present disclosure are directed toward methods and systems for teaching the contents of a playbook and/or testing knowledge of a playbook. In some embodiments, the teaching tools are provided as an interactive testing process where the player is asked a progression of questions about the playbook. The player is provided with a scorecard representing statistical information based upon a player's response to those questions. In some embodiments, the teaching tools are provided as in interactive teaching process where the player is presented with information regarding various sport's actions. In other embodiments, the teaching tool can provide a means for tailoring and presenting plays to one or more users of the teaching tool, the player is provided with a score card representing the player's statistics Stilt in other embodiments, the progression of questions or plays presented can follow one or more formats to enhance comprehension and retention of the playbook contents In some embodiments, the teaching and testing systems may be deployed on a user device in the form of an application. The teaching and testing application may enable a user to interact with the user device, much like a video game, thereby appealing to the player's desire to be entertained rather than taught. In this way, current-day athletes will be motivated to learn the contents of the playbook more quickly. Likewise, coaches can control the amount of content that is provided to players from the teaching and testing application at any given time, which may provide the coaches with a certain amount of control over the learning process. This may also be helpful for installing weekly playbooks and presenting installations to players in group or individual meetings.

Embodiments include a method for teaching playbook content comprising; identifying a first user based in part on a user input, presenting the first user with one of a plurality of playbook simulation modes for selection, presenting the first user with one of a plurality of play groups for selection based at least in part on the selection of the playbook simulation mode, providing the first user with at least one of a plurality simulations based at least in part on the selection of the play group, storing, in a memory, the information associated with the simulation presented and the user identified, and sending at least a second user the information associated with the simulation presented. Aspects of the above method include wherein the playbook simulation modes include at least one of a testing mode, a playbook mode and an installation mode. Aspects of the above method include wherein the testing mode comprises at least one of a plurality of simulations which can test a first user on playbook content based at least partly on the play group selection entered. Aspects of the above method include wherein the testing mode further comprises providing the first user with a first question about a first aspect of a first play. Aspects of the above method include wherein the first aspect of the first play comprises personnel and wherein the second aspect of the first play comprises at least one of formations, routes, protections, check-downs, defensive recognition, and "in the huddle." Aspects of the above method include wherein the playbook mode comprises at least one of a plurality of simulations which can teach the first user playbook content based on the play group selection entered.

Aspects of the above method include wherein the playbook mode further includes a visual and audio presentation. Aspects of the above method include wherein the installation mode comprises at least one of a plurality of simulations that enables the second user to create and tailor a plurality of sports plays based at least partly on the play group selection. Aspects of the above method include wherein the sports play can be taught and projected during a meeting between the second user and at least one or more other users. Aspects of the above method include wherein the playbook content taught by the simulation can be hyperlinked in.

Embodiments include a playbook automation system, comprising; a memory; a processor; a playbook generation module, the playbook generation module configured to: identify a first user based in part on a user input; present, with the processor, the first user with one of a plurality of playbook simulation modes; present the first user with one of a plurality of play groups for selection based at least in part on the selection of the playbook simulation mode; provide the first user with at least one of a plurality of simulations based at least in part on the play group selection; store, in the memory, the information associated with the simulation presented and the user identified; and send at least a second user the information associated with the simulation presented. Aspects of the above system include wherein one of a plurality of playbook simulation modes includes at least one of a testing mode, a playbook mode and an installation mode. Aspects of the above system include wherein the testing mode comprises at least one of a plurality of simulations which can test a first user on a playbook content based at least partly on the group selection entered. Aspects of the above system include wherein the testing mode further comprises providing the first user with a first question about a first aspect of a first play. Aspects of the above system include wherein the installation mode comprises at least one of a plurality of simulations that enables the second user to create and tailor a plurality of sports plays based at least partly on the group selection.

Embodiments include a non-transitory computer readable medium having instructions stored thereon that, when executed by a processor, perform a method comprising: identifying a first user based in part on a user input; presenting the first user with one of a plurality of playbook simulation modes for selection; presenting the first user with one of a plurality of play groups based at least in part on the selection of the playbook simulation mode; providing the first user with a simulation based at least in part on the selection of the play group; storing, in a memory, the information associated with the simulation presented and the user identified; and sending at least a second user the information associated with the simulation presented. Aspects of the above method include wherein one of a plurality of playbook simulation modes include at least one of a testing mode, a playbook mode and an installation mode. Aspects of the above method include wherein the playbook mode comprises at least one of a plurality of simulations which can teach a first user playbook content based on the play group selection entered. Aspects of the above method include wherein the playbook mode further includes a visual and audio presentation. Aspects of the above method include wherein the playbook content taught by the simulation can be hyperlinked in.

The present disclosure can provide a number of advantages depending on the particular aspect, embodiment, and/or configuration. One advantage includes providing a user with a system and method for teaching and learning playbook content. The playbook content including modes and groupings are stored within a playbook database. These options which include testing mode, a playbook mode, and an installation mode can provide a user with three modes for presenting and understanding playbook information. Also, a playbook information can also be presented to various users such as coaches and players in various forms which can help those user's with different learning preferences. The playbook content can also be use by players of various expertise levels as well as fans. Players can be young school grade children, college players, semi-professionals and professionals. These and other advantages will be apparent from the disclosure.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term. "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The terms "user device, "communication device," "smartphone," and "mobile device," and variations thereof, as used herein, can be used interchangeably and may include any type of device capable of communicating with one or more of another device and/or across a communications network, via a communications protocol, and the like. Exemplary communication devices may include but are not limited to smartphones, handheld computers, laptops, netbooks, notebook computers, subnotebooks, tablet computers, scanners, portable gaming devices, phones, pagers, GPS modules, portable music players, and other Internet-enabled and/or network-connected devices.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference letter or label.

DETAILED DESCRIPTION

Presented herein are embodiments of systems, devices, processes, data structures, user interfaces, etc. The embodiments may be related to a playbook simulation system. The system can include other systems associated with it or peripheral devices or communication systems that can communicate with the playbook simulation system and/or other devices. Furthermore, the playbook system can be used to communicate information to an individual or a group of individuals. Further, the system can receive user input in unique ways.

The disclosure will be illustrated below in conjunction with an exemplary communication system. Although well suited for use with, e.g., a system using a server(s) and/or database(s), the disclosure is not limited to use with any particular type of communication system or configuration of system elements. Those skilled in the art will recognize that the disclosed techniques may be used in any communication application in which it is desirable to implement sequenced applications.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein. For example, the playbook simulation system can be modified to present a player with playbook content on the offensive end. Likewise, the simulator can be used to teach playbook content for other sports such as but not limited to baseball, basketball, hockey, etc.

Figure 1:
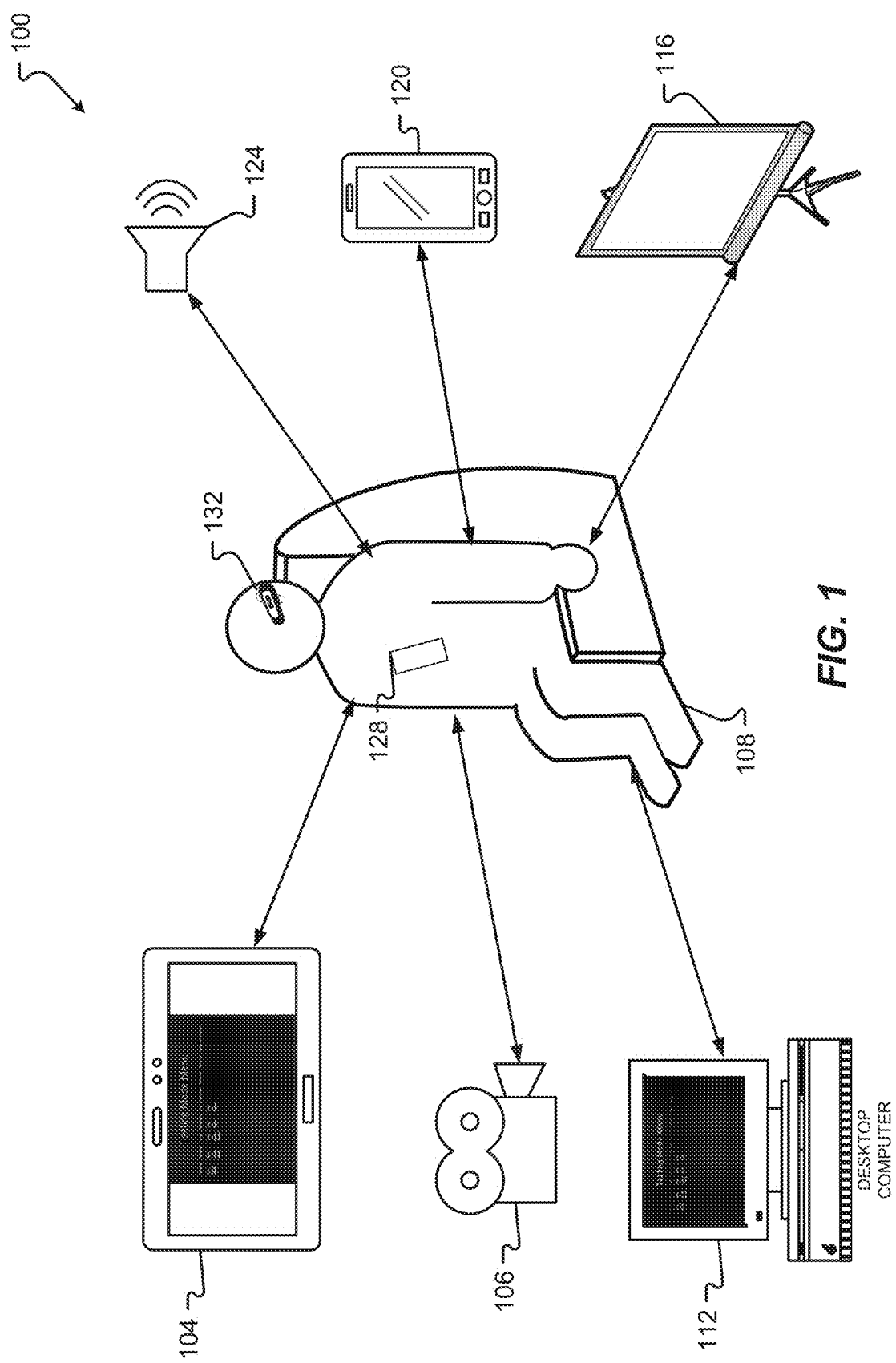
FIG. 1 depicts an embodiment of various presentation formats for teaching playbook content.

A playbook display environment 100 that may contain a playbook simulator is shown in FIG. 1. The playbook display environment 100 presents various instrumentations and/or devices that can be used in conjunction with the playbook simulator for learning and teaching playbook content. Devices for projecting the simulation environment can include but are not limited to a projector 106 and a screen for projection 116. These two instruments can be especially useful in projecting video clips during simulation in any one or all of simulation modes such as testing mode, playbook mode and installation mode. Further detail on each of the modes is provided below. In addition, these two instruments can be used to present an installation to be used in for example an upcoming game. As an example, a coach has thought of a new installation to be used on an upcoming scrimmage game. The coach can create the installation by specifying details such as formations, personnel and passing plays, save the data and during a team meeting project the installation using a playbook simulator.

For a user 108 who is more of an audible learner, an instrument such as a speaker 124 can be more useful. The speaker 124 can be used as an output device, presenting user 108 with various vocal recordings additionally or alternatively, the speaker 124 can be used as in input device recognizing a user's 108 response. For example, the speaker 124 can present the user 108 with audio recording of play calls in the huddle.

In addition or alternatively communication devices such as desktop computer 112 and/or a smartpad 104 can be used for use with the simulator. The smartpad 104 device can be any communication device such as but not limited to, smartphones, mobile devices, handheld computers, laptops, notebooks, netbooks, computers, subnotebooks, table computes, portable gaming devices. These smart electronics can display the playbook simulator in the form of an application such that the user is able to have mobile access to playbook content. Regardless of whether the user 108 is on the bus en route to practice or at home at his desktop, the playbook automation system 200 is easily accessible for quick reference and learning.

Additional communication devices that can be used in conjunction with instruments 104-124 can include wearable media 132 and phones 128. Wearable media 132 can include but is not limited to Bluetooth enabled instruments, Google® glasses, iPods®, watches and other such media that can provide audio and/or video information to a user 108. For example, a user 108 can go on a run early in the morning and before even getting to practice or a team meeting, he or she has already reviewed the content.

Figure 2:
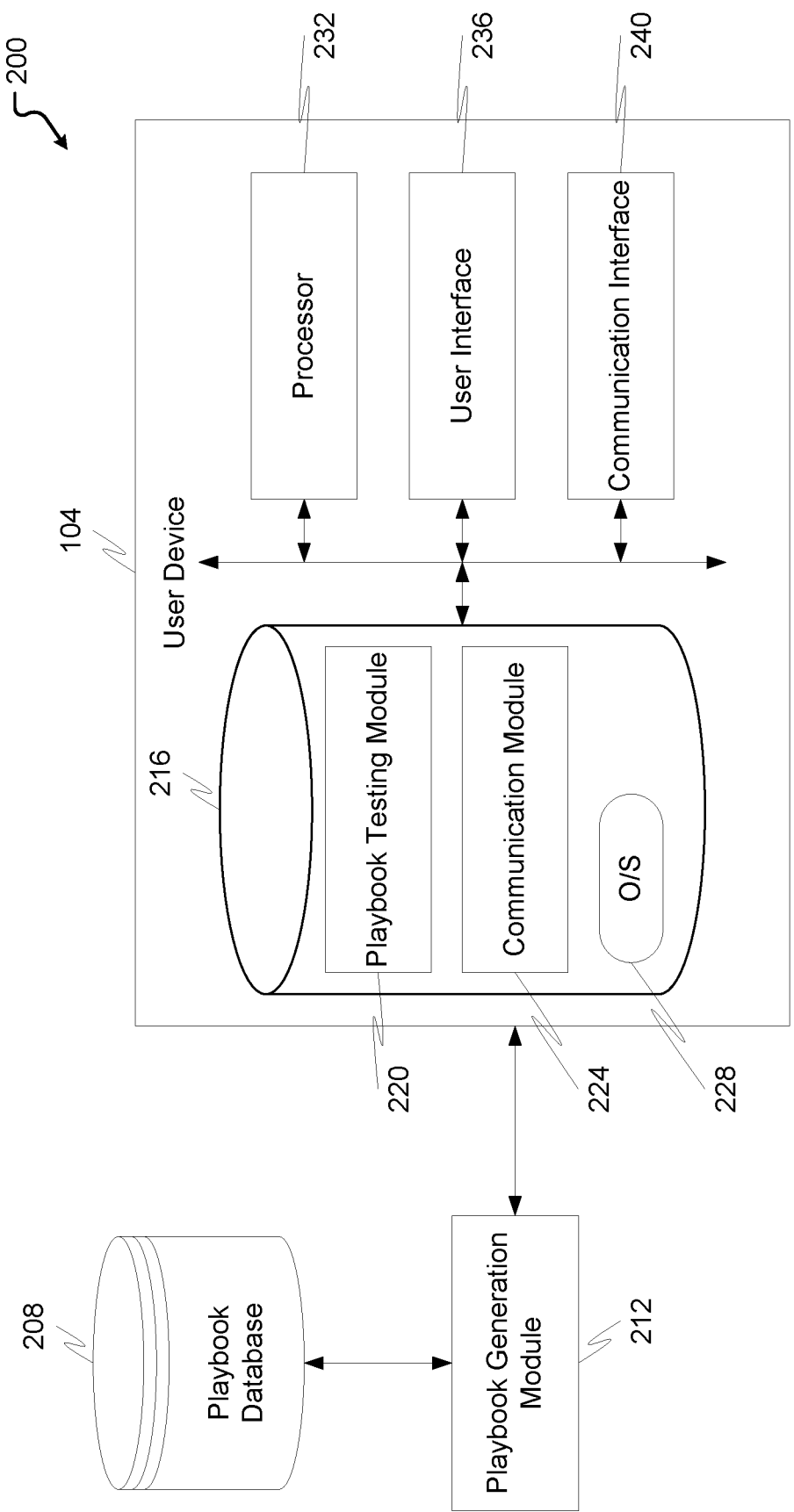
FIG. 2 is a block diagram of an embodiment of a playbook automation system.

Referring to FIG. 2, a playbook automation system 200, or playbook simulator, for teaching and testing playbook content is depicted. The system generally comprises a user device 104 in communication with a playbook generation module 212. The playbook generation module 212 may retrieve playbook content from a playbook database 208. In some embodiments, the contents of the playbook database 208 are configurable by a coach or other authorized personnel responsible for the management of the playbook.

In some embodiments, the playbook database 208 comprises data related to any number of plays, formations, personnel, etc. The data from the playbook database 208 may be maintained in a table, a set of tables, or any other data structure or set of data structures. Playbook information may be provided to a user device 104 via a playbook generation module 212.

In some embodiments, the playbook generation module 212 corresponds to a processing device which retrieves data from the playbook database 208, formats the retrieved data into an appropriate format for processing by the user device 104, and then forwards the re-formatted data to the user device 104. In some embodiments, the playbook generation module 212 may correspond to any known type of device that retrieves raw data (e.g., in the form of object code or as table entries separated by delimiters) and reformats the data into one or more instructions that are contained within a file, set of files, or some other data container (e.g., Java code, one or more eXtensible Markup Language (XML) files, any other markup file, a Hypertext Markup Language (HTML) script, etc.). In some embodiments, the playbook generation module 212 may be embedded in the playbook database 208 and, therefore, is able to generate appropriate playbook data for providing to multiple different user devices 104. In some embodiments, the playbook generation module 212 may be configured to adjust the playbook data provided to the user device 104 depending upon the user that is identified as using the user device 104. For example, the playbook generation module 212 may retrieve a single set of playbook data from the playbook database 208 and generate two different sets of playbook data for two different users. More specifically, the playbook generation module 212 may be configured send a first set of plays to a first user type and a second set of plays to a second user type. The first and second user types may vary according to one or more of offensive vs. defensive players, or by specific position such as quarterback, offensive lineman, wide receiver, running back, tight end, defensive lineman, linebacker, safety, cornerback, special teams, etc. Stated another way, the playbook generation module 212 may receive a single instance of playbook data from the playbook database 208 and format the single instance of data into multiple instances of playbook data, depending upon the target recipient of such data. This enables the playbook generation module 212 to specifically test each player's respective knowledge of the playbook data in a manner that is consistent with the player's position. However, it may also be desirable to test players on positions other than their own, thereby enabling a coach to assess whether the player has a complete knowledge of the playbook or just a granular knowledge of the playbook.

As can be appreciated by those of ordinary skill in the art, the playbook generation module 212 may alternatively, or additionally, be incorporated into the user device 104. In some embodiments, the playbook generation module 212 may be stored as a set of instructions in the user device's 104 memory 216 and may be executed as an application by the processor 232 of the user device 104. In particular, the playbook generation module 212 may be implemented as a sub-routine of the playbook testing module 220 when it is incorporated in the user device 104. The operational parameters of the playbook generation module 212 may, therefore, be set by a user of the user device 104, thereby enabling local control over the manner in which the playbook generation module 212 reformats the data from the playbook database 208.

In some embodiments, the playbook database 208 may be separated by the user device 104 by a communication network (e.g., Internet, Wide Area Network (WAN), Local Area Network (LAN), cellular network, combinations thereof, or any other packet or circuit-switched network.

In such embodiments, the user device may employ its communication interface 240 and a communication module 224 to format communication messages received from the playbook database 208 (and possibly the playbook generation module 212). In some embodiments, communication packets are received at the communication interface 240 (e.g., a communication port, antenna, network adaptor card, etc.) and are then processed by the communication module 224. The communication module 224 enables the user device 104 to receive a plurality of communication packets, each containing a subset of playbook data and condition the playbook data from the plurality of packets for processing by the playbook testing module 220. The functionality of the communication module 224 may decode, decrypt, or reformat the communication packets received at the communication interface 240 so as to extract the playbook data from the communication packets.

Once the playbook data is extracted from the communication packets, the playbook testing module 220 is employed to generate one or more outputs for display by the user interface 236. The outputs generated by the playbook testing module 220 may be designed to either teach the user of the user device 104 about the playbook data from the playbook database 208 and/or to test the user of the user device 104 about the playbook data from the playbook database 208. Examples of such outputs are depicted and described in more detail in Exhibit A. In particular, the playbook testing module 120 may be configured to generate one or more visual and/or audio outputs which, when presented to the user by the user interface 136, teach and/or test the user about the playbook.

In some embodiments, the contents of memory 2116 playbook testing module 220, communication module 224, and operating system 228 (O/S)) are implemented as computer-readable instructions stored in memory 216 and those instructions may be executed by the processor 232. Accordingly, the processor 232 may comprise one or more of an Integrated Circuit (IC) chip, a Digital Signal Processor (DSP), or any other hardware component configured to read and execute instructions stored in memory 216. In alternative embodiments, the instructions may be executed as firmware and/or by an Application Specific Integrated Circuit (ASIC).

The O/S 128, in some embodiments, may comprise a high-level application operating on the user device 104 which allows a user of the user device to navigate the various applications stored in memory 216 and invoke such applications when desired.

The user interface 236 may correspond to a user input, a user output, and/or a combination user input/output. Examples of user inputs include, without limitation, a microphone, a button, a keyboard, a mouse, a trackball, a video camera, and the like. Examples of user outputs include, without limitation, a speaker, a Light Emitting Diode (LED), a series of LEDs, a display screen (e.g., Cathode Ray Tube (CRT), Liquid Crystal Display (LCD), plasma, LED, etc.), or the like. One example of a combination user input/output includes, without limitation, a touchscreen interface.

It should be appreciated that the user device 104 may correspond to any type of known user device or combination of known user devices. As some non-limiting examples, the user device 104 may comprise a computer, a laptop, a netbook (or similar thin client device), a touchpad, a phone (e.g., cellular phone, smartphone, etc.), a television (interactive or traditional), and the like.

As noted above, the combination of the playbook database 208, the playbook generation module 212, and the playbook testing module 220 may be employed to teach players playbook content as well as test knowledge of playbook content. With reference to FIG. 2 and Exhibit A, examples of the ways in which a playbook can be taught and/or testing will be described in further detail. As can be appreciated by those of ordinary skill in the art, although the embodiments described herein are only related to a specific set of user inputs (e.g., click, select, drag and drop, etc.), various other types of user inputs may be received during the teaching and testing methods described herein. In other words, the present invention should not be construed as being limited to the specific teaching and testing examples described herein.

Figure 3:
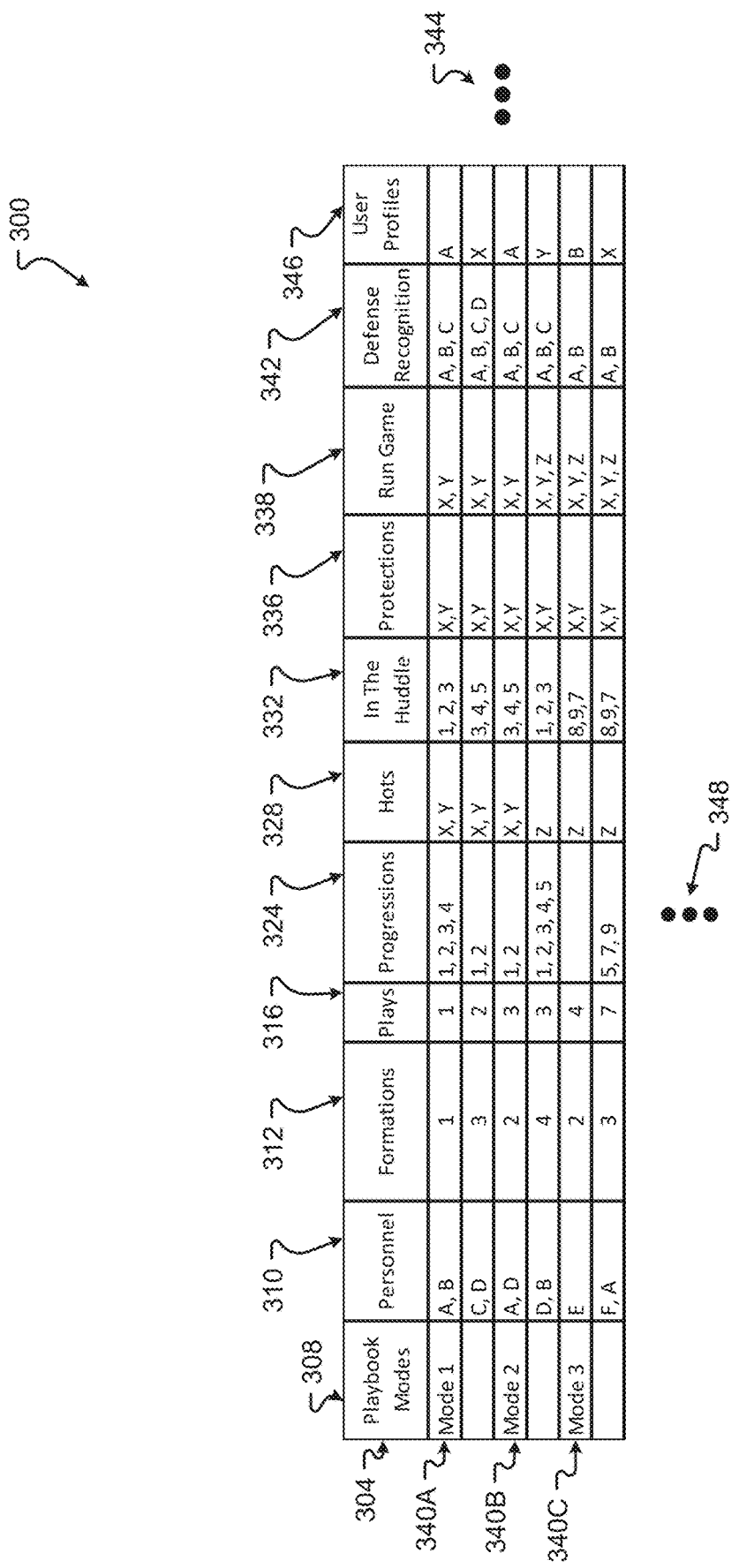
FIG. 3 is a diagram of a data structure for storing playbook automation system permutations.

FIG. 3 shows various embodiments of a data structure 300 to store different settings. The data structure 300 may include one or more of data files or data objects 304. Thus, the data structure 300 may represent different types of databases or data storage, for example, object-oriented databases, flat file data structures, relational database, or other types of data storage arrangements. Embodiments of the data structure 300 disclosed herein may be separate, combined, and/or distributed. Furthermore, the data structure 300 may be used to represent playbook content for different playbook modes. As indicated in FIG. 3, there may be more or fewer portions in the data structure 300, as represented by ellipses 344. Further, there may be more or fewer files in the data structure 300, as represented by ellipses 348.

Referring to FIG. 3, a first data structure is shown, which may include information. The data file 304 may include several portions 308-346 representing different types of data. Each of these types of data may be associated with a mode, as shown in portion 308.

There may be one or more modes 340 and associated data stored within the data file 304. As provided herein, the mode can be any mode available within the user device 104 that teaches or tests playbook content. Such modes can include but are not limited to a test mode, a playbook mode and an installation mode. These modes 340 contain one or more groupings 310-346 that further identify the mode 340. This grouping can be used to tailor how a user 108 will be tested or taught and how the user 108 can interact with the playbook automation system 200. A first group can include personnel data which would be stored in position 310. Personnel data stored in position 310 can be retrieved when testing or teaching a user 108. For example, position 310 can contain information regarding the personnel that should be out on the field and grouping needed based in part at least on one or more of game plan, match ups, down and distance, score, and field position. The data can be of any type and can store personnel groupings such as but not limited to Base, Tiger, U, Zebra, Eagle, E, Trey, U Goal Line, and Cinco. For example, on a first and ten, Base personnel should be used, where on a third and long, Zebra personnel is more appropriate. The user 108 can be presented with the data in position 310 by visual or audio recording which can or cannot include specific user input.

In understanding a playbook, the user 108 needs to familiarize him/herself with formations. Position 312 in data structure 300 is designed to hold a repository of formations available for user 108 to call and use. The formations identified and stored in position 312 can vary from very basic user line ups to more complex formations which include a combination of shifts, motions and splits. The user 108 in learning these formations stored within position 312 can call and designate the formation and or combination of motions, shifts, and splits to be quizzed on. The user 108 may be presented with a formation by means of a visual or audio output. For example, a football field can appear on a screen with side lines, numbers and hash marks for reference points. The user 108 must select the correct player and place the player in the correct line up position. Another example, can include an audio reading of a formation instead of an on screen display.

Each mode, identified in portion 308, may have a plays and progressions. The plays are stored in portion 316 and the progressions in portion 324 of data structure 300. Plays would incorporate actions of the players following a kickoff or snap. The plays can include plays such as but not limited to, running and passing actions.

The progression portion 324 can be directed to various progressions that can be used in conjunction with various groupings, such as routes in position 328 and protections in position 336. For example, quarterback can use the playbook automated system 200 to help identify plays, being presented with a scenario that includes understanding that when running back is not in the progression, the quarterback has the option to do a quick throw or an outlet pass if the play breaks down. Furthermore, the playbook automation system 200 can use the progression portion 324 to provide a user 108 with footwork associated with the play stored in portion 316. The footwork can be presented via a visual display, a picture, video presentation or a small bubble explaining such.

Each mode, identified in portion 308, may also have different hot routes stored in position 328. Position 328 can include a repository of routes, including but not limited to those designated for quick throws or hot routes. For example, position 328 can hold a hot route which would provide a quarterback with the designated throw in the instance where the defense blitzes more people than the offense can pick up. Hot routes can be tested or taught by visual display on a device 104, video display, picture, hyperlink, or audio representation. This data may be used to present the user 108 with tailored information, including but not limited to hot routes.

Portions 332-342, include other group characteristics that that further identify the mode selected for simulation. The In the Huddle group stored in position 332 includes but is not limited to voice recordings, videos and plays which provide a user 108 with personnel grouping and play calls. The voice recordings stored in portion 332 for in the Huddle, could then be used during simulation of one of modes 308 to provide a user 108, such as a quarterback, with the opportunity to hear and repeat a play. For example, the quarterback in preparation from a game may need practice hearing and repeating play calls. With a voice recording of the personnel grouping and play call, the quarterback can practice getting the correct wording and understand of what needs to be done once at the line of scrimmage. An illustration of voice recording, assume the playbook automated system 200 provides an audible presentation of the following play: "Explode to Gun Double Right Flip Zebra Scat Left Y Drag X Hook F Trail Alert 52 Sprint Draw." The player can then repeat the statement and the simulator can record the user 108 response. In response to the user 108 statement, the playbook simulator can compute the statement's correctness and present the user 108 with a percentage and word count. Simulator recording could for example, record user 108 voice, display recordation in contrast with audio recording played for user 108 and highlight, underline, circle or other such delineation of incorrect wording. The simulator can further provide the user 108 with tabulation of correct responses. The simulator can also provide the user 108 with tabulation of incorrect responses. Therefore, in response to earlier simulator voice recording, the user's 108 voice response and display could include "Explode to Gun Double Left Flip Zebra Scat Z Drag X Hook F Sneak Alert 52 Sprint Draw," with a 160/176 in word count or 91%.

Protections are stored in portion 336. Protections stored in this position can include but are not limited to "2 Jet", "54", and "76." Protections can be used in combination with defenses (like those in position 342) by the playbook automation system 200. A user 108 is able cycle through and select through the protection that needs to be learned. The user 108 is able to interactively click on positions for given protection, view a clip on the formation or listen to such protection being studied.

Mode 308 can also contain a category for run game actions which are stored in portion 338. Run game actions can be incorporated with the playbook automation system 200 similar to protections mentioned herein. A user 108 can use the playbook automation system 200 to learn about the running game. This simulation can incorporate blocking schemes, blocks used and footwork. For example, a user 108, such as a quarterback can be quizzed on calls and checks in the running game. As another example, a running back can be tested or taught footwork, sprint spots and reads.

Another group in mode 308 includes defense recognition plays which can be stored in portion 342. Defense recognition plays can be used to teach a user 108, how to set the defense based on the protection and run play set on the field. This information stored in portion 342 of data structure 300 can be used in conjunction with any combination of or more of groupings 312-338, such as but not limited to run plays 338, protections 336, and formations 312. Data in portion 342 is integrated into the playbook automation system 200 to present a user 108 with a means for learning or presenting playbook content. The data can be presented in any of the following median, but not limited to audio recordings, visual presentation requiring user interaction, video presentation, hyperlink, etc.

Individual users 108 using the playbook automation system 200 can also have user records and profiles stored in position 346. This position can include one or more types of data that may be associated with a user including, but not limited to user name, position and scores received on the various simulations. The user 108 profile can also be presented and stored in a separate data structure similar to data structure 300 which can include more detailed information about a user 108. Such information can include statistics on user performance based on use of the playbook automation system 200, personal data, name, number, position, and modes with best or poorest performance.

Figure 4:
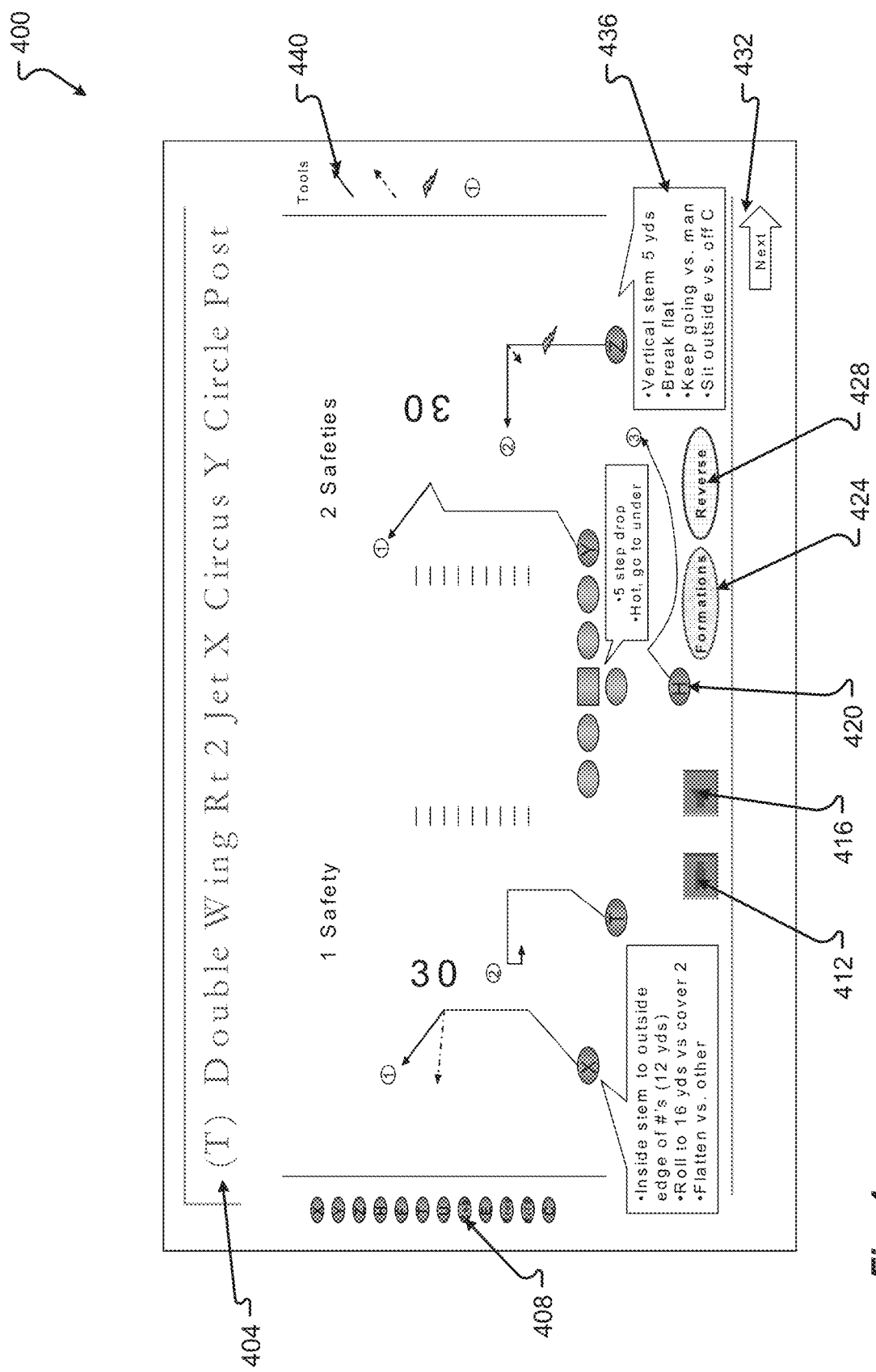
FIG. 4 is a diagram of an embodiment of a testing mode for teaching and testing playbook content.

FIG. 4 is an embodiment of the playbook automation system 200, in testing mode presentation 400. The testing mode presentation 400 is only one of many options for testing playbook content. Testing mode is an option provided by the playbook automation system 200 for teaching and learning playbook content. This mode provides a user 108 with many options for testing one or more of the groupings described in conjunction with FIG. 3. When the test mode option has been initiated, a user can be provided with a menu of options to select from. This option can include but is not limited to different installations, plays against certain teams (e.g. vs. Green Bay Packers), Red Zone testing or the option to select all. Once the user has selected the corresponding option, the user 108 can additionally or alternatively select from a testing menu the grouping to be tested on based at least in part on the previous selection made. The groups as mentioned herein can include those stored in data structure 300 such as personnel, formations, plays, progressions, hots, "in the huddle", protections, run game and defensive recognition. Each of these groups can be further specified in terms of how a user 108 would like to be tested.

Testing selections available include but are not limited to Read, Signals, Identify, Hear and any other testing selections that are or can become available to teach playbook content. The user 108 can pick one or more of the selection options for testing. If a user 108 picks Read as the testing selection, a user 108 will be presented with an interactive simulation which entails user input. This would for example provide a user with the option to click, drag and drop, gesture, input, type in or other such input that requires user response. Clicking can be on positions, players, video or voice recordings icons, and/or hyperlinks.

A user selecting Signals option would be provided with a simulation which includes video recordings played to user 108. Video recordings can be used in one or all of the grouping available for testing including but not limited to Personnel, Formation, Plays, Progression, Hots and Defensive Recognition. For example, user 108 can choose or be designated to test on plays. The presentation method can be the Signals selection. The playbook automation system 200 can present user 108 with a video of a play, the user then would have to complete the play through interactive input through drag and drop, click or other input which would place or move players on display to the correct position or tree route.

An Identify selection can provide a user with a simulation whose inputs includes a user's recording. This selection can be useful in testing personnel, formations, plays and "in the huddle" groupings for example. As an example, a user 108 being tested on formations, who selects Identify, can be presented with a formation on the screen. As a response, the user 108 can vocally record the formation displayed.

A Hear selection can provide a user 108 with a simulation which includes voice recordings played to user 108. For example, a user could select the "In the Huddle" group and Hear option, would be played a voice recording of a play call and the user 108 would then have to repeat and/or record what is heard. The recording would enable the user to identify incorrect play repeats and aid in memorization for example. Information on "In the Huddle" options is described herein and in conjunction with FIG. 3.

In one embodiment of the present invention, as displayed in Testing Mode Presentation 400 in FIG. 4, more than one of the presentation methods can be selected and used. For example, play 404, positions 408, player 420, bubble 436, and tools 440 are components within the testing mode that require user input such as those used in the Read Selection. Play 404 is a Read selection which presents the play for testing. Additionally or alternatively, a space may be provided for a user to write and identify the play. Positions 408, can be presented as in Testing mode presentation 400 on the side of the screen such that a user 108 can for example, but not limited to, select, click, drag and drop on their preserved location for the play tested. Player 420 is another Read option which requires user interaction. Here the user 108 moves player to given location or can designate it a position based on formation, play, group, etc tested. Bubble 436 can be a tool used to present a user with the correct move, with feedback on a player move, or just additional information regarding the topic tested. Tools 440 provide a user 108 with the option to draw route combinations using the tools available by for example, line, highlighting, and dotted line. Video clips 412 and audio recordings 416 are also presented in this testing mode as part of either the identify, Signal or Hear selections.

For example, in test mode simulation presented in 400, a user can align correct players or personnel in correct position by click or drag and drop from position 408 to correct location on the field. Next, a user can draw a route combination or pass pattern of a play by clicking the tools 440. In moving the players around, a bubble 436 can appear specifying footwork, a receiver's release, depth, landmark and adjustment for each route. If the user then requires reinforcement, a video clip 412 can be selected and displayed.

Other options that can be presented to a user on a testing mode presentation 400 can include but are not limited to the option to reverse 428 the play or presentation method, a next option 432 to proceed to the next question, a save option, and a flag for future reference. For example a user may like to learn by viewing a play, the reverse button can allow the user 108 to respond by audio recording the corresponding play call, shift, split, formation, motion, protection or route.

Further, a group button 424 can be a displayed to provide the user information on the group tested. Additionally or alternatively, the button can be selected which can allow a user to toggle between different groups. For example, a user studying routes can jump to protections and check downs as they are all related.

Figure 5:
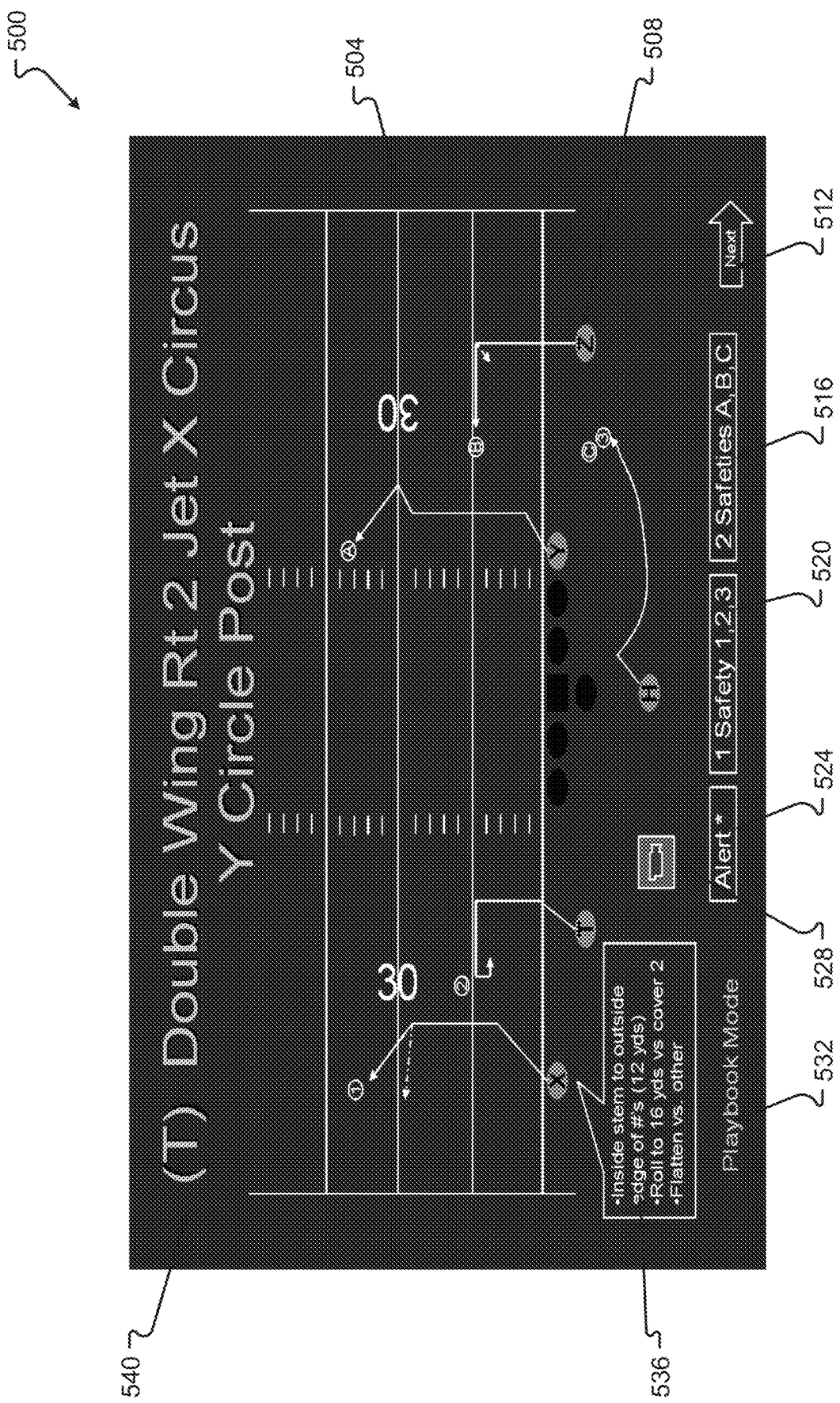
FIG. 5 is a diagram of an embodiment of a playbook mode for teaching playbook content.

Another embodiment of the playbook automation system 200 is offered in FIG. 5. This embodiment includes presentation of the playbook automation system 200, in playbook mode presentation 500. The playbook mode is very much like the testing mode presentation 400 in FIG. 4. The playbook mode however, can simulate without tracking correct vs. incorrect responses or presenting information to user 108 differently. Description of this mode is described herein and in conjunction with FIG. 4. The playbook can also start with options for user selection including but not limited to the groupings and presentation methods. Groupings included in FIG. 3 are incorporated herein and can include personnel, formations, plays, progressions, hots, "in the huddle", protections, run game and defensive recognitions. Presentation methods can also include Hear, Identify, Signal and Read.

FIG. 5 presents one of numerous permutations of playbook content learning available on the "Ready List," playbook automation system 200. Playbook Mode Presentation 500, contains simulated field 504 which can include icons 508 which can be moved, dragged and dropped, clicked, and modified according to play 540. As a player 508 is moved within a play on a tree route, by a user 108, a bubble 536 can appear. Like in Testing provide presentation 400, the bubble can include but is not limited to details on footwork, landmark, and adjustments for a route.

The user 108 in learning playbook content can be provided with video clips 528 of the play 540 for better understanding of the play or specific content being taught. Audio recording and other media outputs can also be available for a user to listen much like in huddle to play being called. Pointers 524, 520 and 516 are other options available to the user 108. These pointers can provide switch for example, but not limited to between different plays, formations, groupings, and alerts.

Group button 532 can be a displayed to provide the user information on the group taught. Additionally or alternatively, the button can be selected which can allow a user to toggle between different groups. For example, a user studying routes can jump to protections and check downs as they are all related. A next 512 option is available for a user to proceed to the next group, play, formation, video, etc.

Figure 6:
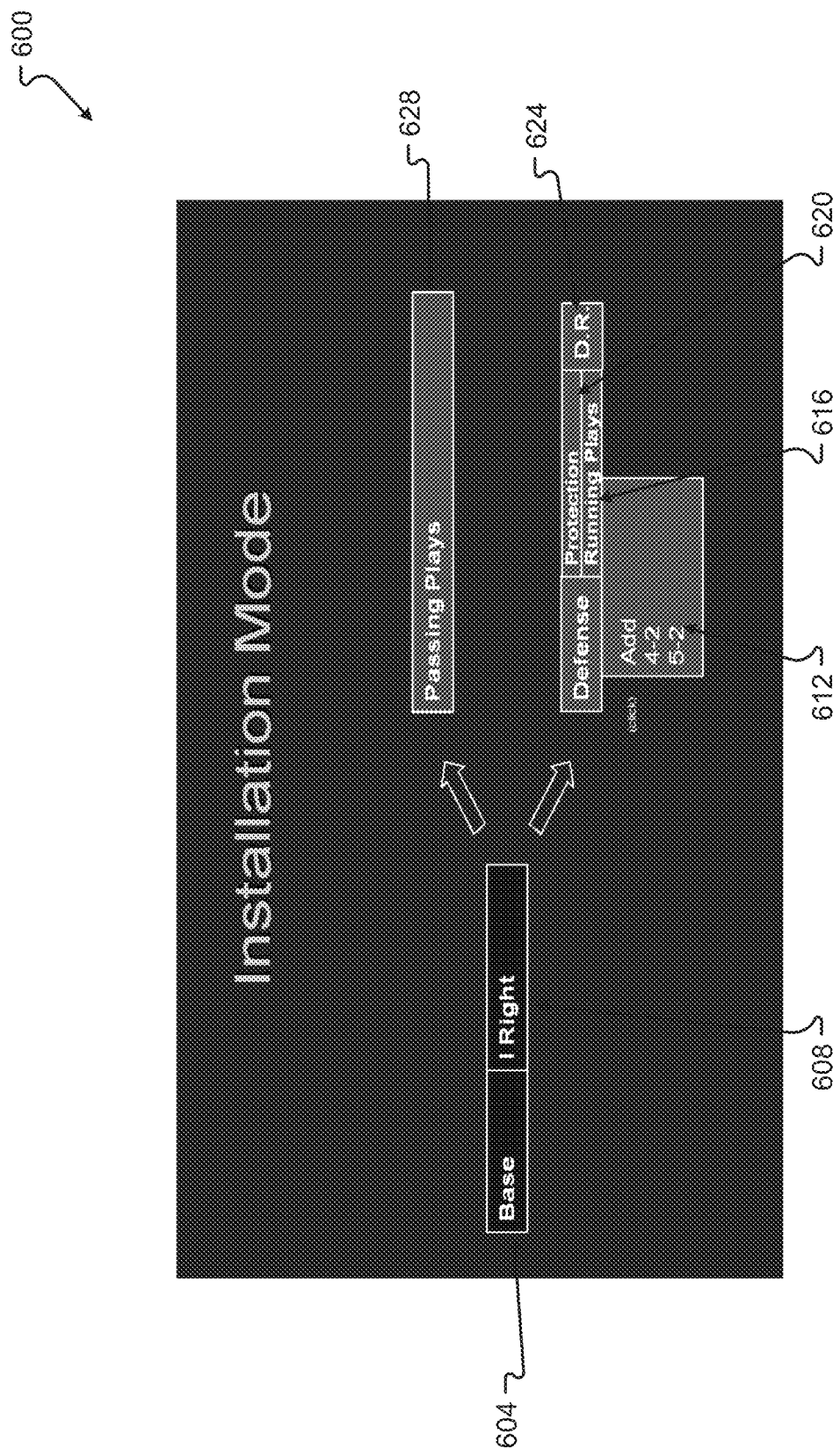
FIG. 6 is a diagram of an embodiment of an installation mode for teaching playbook content.

FIG. 6 is an embodiment of the playbook automation system 200, in installation mode presentation 600. The installation mode can include a method for at least presenting, projecting or displaying installation plays by sports personnel. For example, a coach during a team meeting can use the playbook system described herein and in conjunction FIGS. 1-5, to show the football team a new installation he wants the team to learn for an upcoming game. The coach in generating the installation play to be presented to the team can select from various groups options 604-624 to create the specific action he wants to project. The coach can further include a video clip of such action. During the team meeting, the coach can for example, pull up this playbook meeting in a user device 104 and project the simulation on the wall. The coach can also use but is not limited to calling the simulation by hyperlink.

In entering installation mode presentation 600, the user 108 can be presented with a diagram similar to that in FIG. 600. Each of the blocks 604-628 represent grouping the user 108 can select. The blocks 604-628 can come in the form of a pull down menu, a table, a chart or other representation which would enable a user 108 to select from or add. The user 108 can navigate through each group 604-628 and option within the group 604-628 and tailor the installation to be presented. The number of groups and types of groups can be more or less than those presented.

Group labeled Base, for example, can correspond to personnel 604. Personnel as described herein and in conjunction with FIG. 3 can include, the personnel that should be out on the field and grouping needed based in part at least on one or more of game plans, match ups, down and distance, score, and field position. The data can be of any type and can store personnel groupings such as hut not limited to Base, Tiger, U, Zebra, Eagle, E, Trey, U Goal Line, and Cinco. The user 108, can be presented with a pull down menu for example with Base, Tiger, Cnico option and can click on or add the grouping to be used. As demonstrated in FIG. 6, a Base personnel grouping was selected as an example. Further, the user 108 can be given the option to tailor the grouping even further by presentation of a second screen. In a second screen, the user 108 can designate but is not limited to, a new personnel grouping, letters for positions, video clips, pictures, voice recordings or other media available that can be useful in teaching playbook content. Content selected can also be saved for future retrieval.

Formations grouping 608 like personnel grouping 604 can be a pull down menu, table or other such option that would provide the user 108 with the option to select a formation to present. Formations as described herein and in conjunction with FIG. 3 include basic user line ups or more complex formations which include a combination of shifts, motions and splits. As demonstrated in FIG. 6, I Right was selected as the personnel grouping 608 as an example. The personnel grouping can be selected based on a predetermined list and/or a new grouping can be added by a user 108. Further, the user 108 can be given the option to tailor the formation grouping even further by presentation of a second screen. In a second screen, the user 108 can designate but is not limited to, a new formation grouping, can move players to formation, can add video clips, pictures, voice recordings, notes, names and or other media available that can be useful in teaching playbook content. Content selected can also be saved for future retrieval.

User 108 can then select but is not limited to an installation with passing plays or running play. For example, in opting for running play, the user now has the option to at least select but is not limited to, groupings 612-624. Defense Grouping 612 as described herein and in conjunction with FIG. 3, entails selecting running plays. A user 108 is provided with but is not limited to a drop down menu on the play to run. As illustrated in FIG. 6, plays such as 4-2. 5-2 can be presented or other plays can be added. Is a user 108 wishes to further tailor either the play selected or add a new play, a new window can be presented. The second window in the playbook automated system 200 can include but is not limited to provided feedback regarding personnel and formation already selected, name of new play if adding one and position of defensive players. In addition or alternatively, the user 108, can manually insert at least, but is not limited to positions on a simulated field, or insert shades for the positions. The user 108 can also save the data created and tailored for later retrieval. The data stored for this grouping or any other grouping within the installation mode, can be used in a coach's meeting, team meeting or an individual meeting between a coach and a player. The installation mode can also be used in conjunction with the testing or playbook mode for teaching purposes. For example, a coach can use the installation mode to draw plays for the testing mode. The information can be presented on a user device 104 or any other device as described in conjunction with FIG. 1.

Group labeled 616, can be used to designate running plays. In this option, the user 108 can select from one or more of the various run plays available for selection. Description of running plays can be found in position 338 of data structure 300 in conjunction with FIG. 3. As an example, running plays for selection can include, but are not limited to Toss 39 or 19 HO Weak. As with the other groupings, running plays 616 also has the option to add and tailor the plays. A second window can be presented to the user with the option. The second window can include a description of the personnel, formation, and defense previously selected. In addition, the second screen can provide a user with the option to name a new running play or add a new one. The user 108 also has the option to add film and other media recordings for playbook content learning. The user 108 can also provide details on how players will run based on an automated field provided on a screen. In addition, the user can save the content added and selections made for a later date.

Protections grouping 620 like personnel grouping 604 can be a pull down menu, table or other such option that would provide the user 108 with the option to select a formation to present. Protections as described herein and in conjunction with FIG. 3 can include but are not limited to "2 Jet","76" and "54." As an example, a user can select 54 as the protection to run. Additionally or alternatively, the user can select another protection by either selection or by addition of that protection. Further, the user 108 can be given the option to tailor the protection grouping even further by presentation of a second screen. In a second screen, the user 108 can be presented with the personnel, formations and defense preselected. The user can also be presented with the option to designate but is not limited to, a new protection grouping, can add video clips, pictures, voice recordings, notes, names and or other media available that can be useful in teaching playbook content. Content selected can also be saved for future retrieval.

Group labeled D.R., for example, can correspond to defensive recognition 624. Defensive Recognition is stored in position 342 of data structure 300 in FIG. 3. Defensive recognition is an accumulation of how to respond based on run plays 338, protections 336, and formations 312. Further, the user 108 can be given the option to tailor the grouping even further by presentation of a second screen. In a second screen, the user 108 can designate but is not limited to, a new personnel grouping, letters for positions, video clips, pictures, voice recordings or other media available that can be useful in teaching playbook content. Content selected can also be saved for future retrieval.

If a user 108 decides that a passing play is the preferred installation for presentation, the user 108 selects on 628. Selection can occur by touch, click, sense of finger over screen for this and any other block for selection under the installation mode, testing mode, playbook mode or other modes available through the playbook automated system 200. Possible passing play selections can include but are not limited to "2 Jet Scissors Y Shallow Cross" or "76 Y Spot." The user 108 then has the option to further tailor an play or action provided or create a new one. A second screen can be presented to the user or alternatively the same Installation Mode Presentation screen 600 can be used to make additions to this or any of the option groupings 604-628. The window with the modification options can include a summary of the personal and formation selected in addition to the name entered or selected for the corresponding passing play. Voice recordings, video clips, pictures and other media can be added to that can be used in presentation of the installation to one or more users. A simulated field can also be used to add notes, move and designate players and positions and further, route trees can be created. The option to save is also available for future use.

Figure 7:
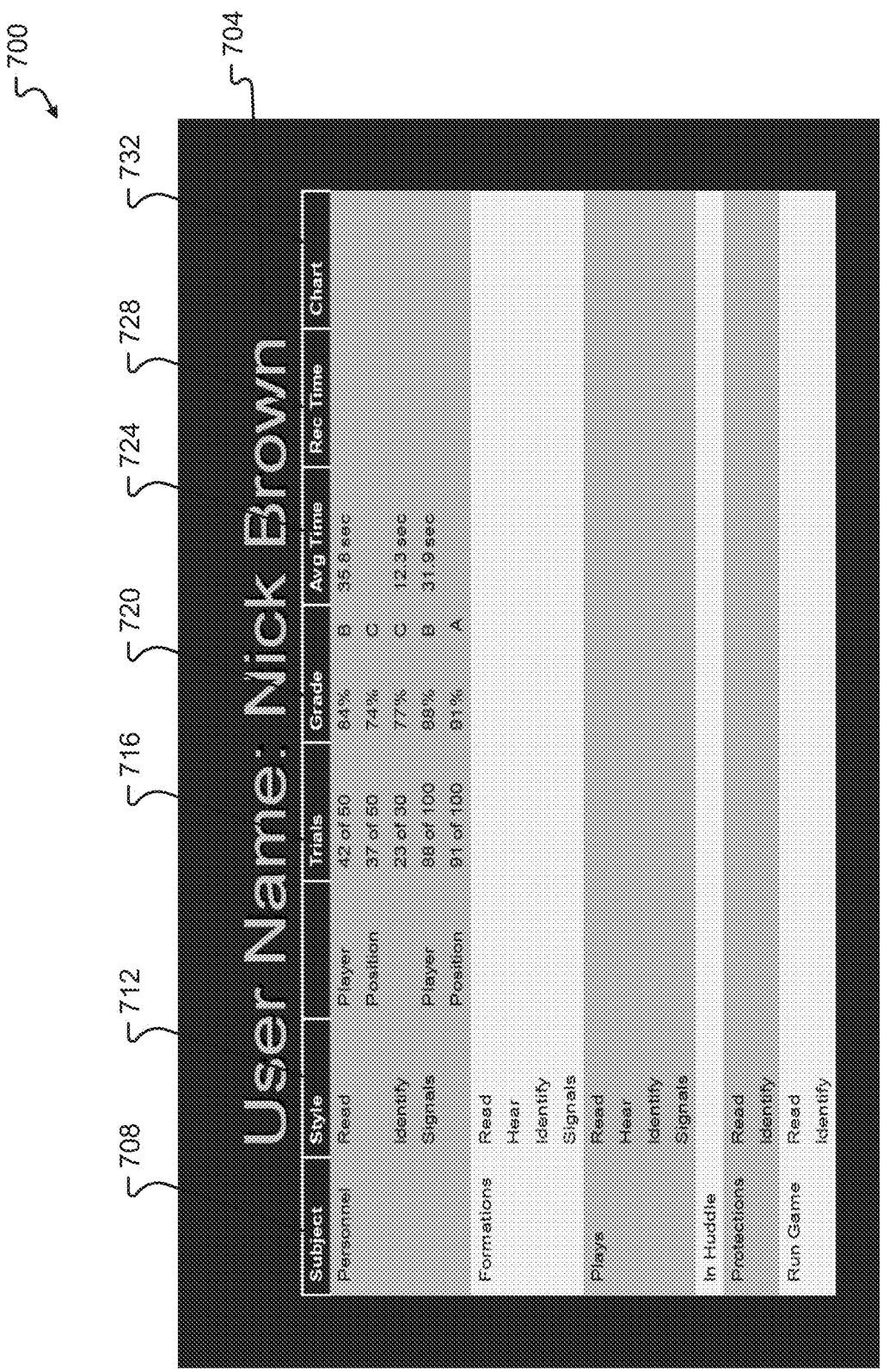
FIG. 7 is a diagram of an embodiment of a score card for reporting user results.

Another embodiment of a playbook automation system 200 is shown in FIG. 7. In the present embodiment, a score card 700 is presented. This presentation can include, but is not limited to the name 704, profile, statistics and groups simulated and performed by a user 108. Groupings as presented in data structure 300 corresponding to FIG. 3, positions 310-346, can be presented in a vertical or horizontal manner such that it provides a sports personnel with details regarding the subject 708 simulated by user 108. Further, the presentation method or style 712, can also be detailed on this score card 700. Style 712, can include information including but not limited how the simulation was presented. That is, for example if a video was used, an audio recording or user input for testing. Such styles can be summarized by using at least the following naming convention, signals, identify, read, or hear. Signals can include but are not limited to video display, identify can include but is not limited to use of audio recordings, hear can include but is not limited to voice recording inputs by user, and read can include but is not limited to user selections.

Statistical data regarding user results can be displayed by using at least one of signals 716, grade 720 average time 724, record time 728 and charts 732. This data can be modified and presented in any of charts, percentages, decimals, factions, and time. More or less data can be added as needed for user 108 evaluation.

Figure 8:
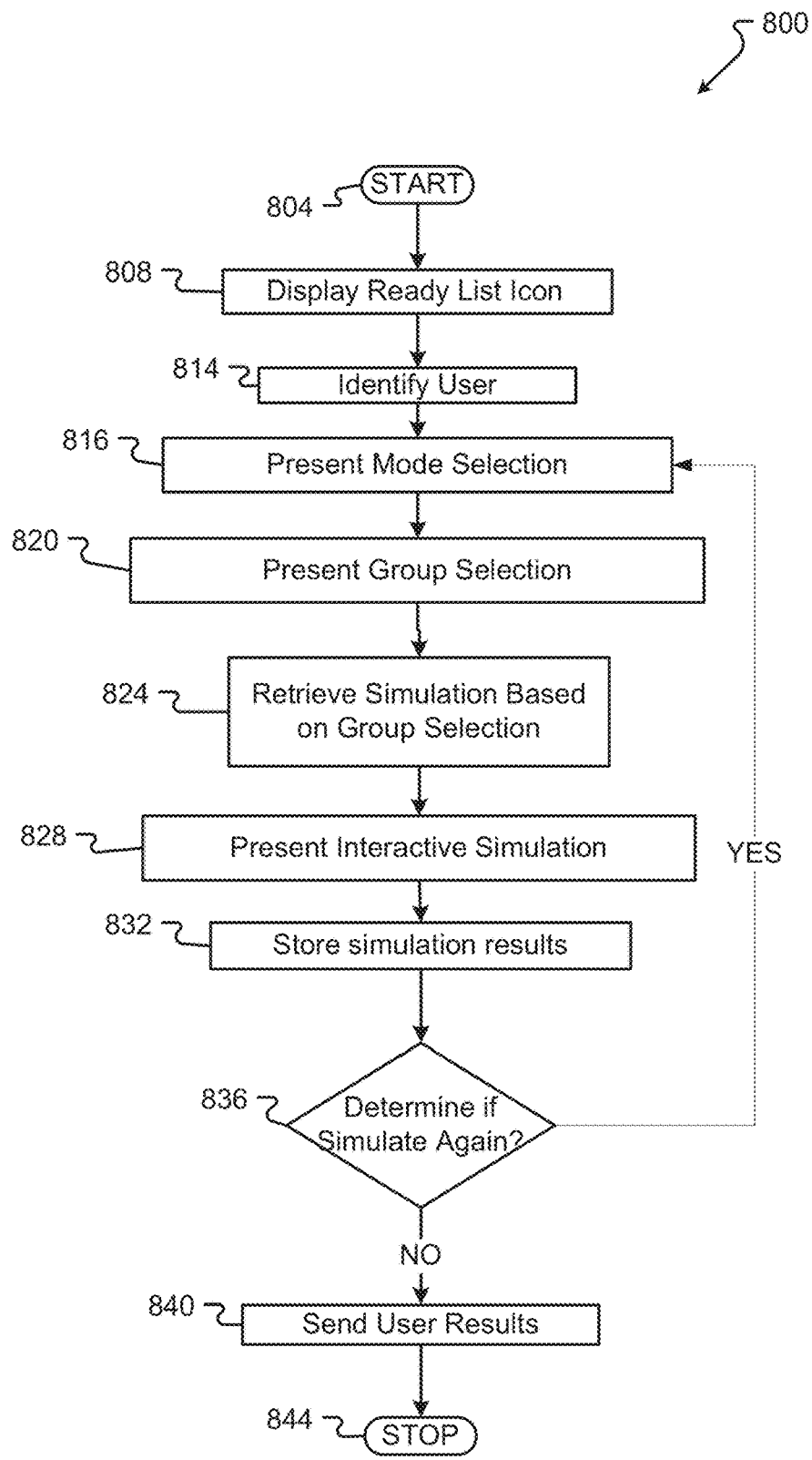
FIG. 8 is a flow or process diagram of a method for testing and teaching playbook content.

An embodiment of a method 800 for teaching and testing playbook content is shown in FIG. 8. A general order for the steps of the method 800 is shown in FIG. 8. Generally, the method 800 starts with a start operation 804 and ends with an end operation 844. The method 800 can include more or fewer steps or can arrange the order of the steps differently than those shown in FIG. 8. The method 800 can be executed as a set of computer-executable instructions executed by a computer system and encoded or stored on a computer readable medium. Hereinafter, the method 800 shall be explained with reference to the systems, components, modules, software, data structures, user interfaces, etc. described in conjunction with FIGS. 1-7.

The user device 104 can determine if a person is initiating the use of the playbook content simulator in step 808. This determination can be made by receiving a data input from a user 108, device 104 or other interface. The data input can include but is not limited to the selection of and double clicking of an application icon, selection through a hyperlink or other such input. Once the simulator has been initiated, the user will be identified, in step 814. The identification of the user 108 can occur through input of a data such as but not limited to, user name, player number, unique code, or other identifying instrument. Once the user 108 is identified, the user 108 can be for example be associated with a user profile 346, as described herein.

Once the user 108 has been identified and/or user profile retrieved, simulator preferences can be selected as in step 814. Step 816 corresponds to the selection of at least one of a plurality of modes available for teaching and learning the playbook content. Such modes can include, but are not limited to a playbook mode, a testing mode and/or an installation mode. By way of example, an installation mode is a teaching mechanism enabling sports personnel, such as a coach to teach and project installations for a game during a coach's meeting, meeting with the team or meeting with an individual player. Thus, a coach is able to select the installation mode and other designated options as described in conjunction with FIG. 6 to demonstrate a specific action he wants to teach.

Using the mode selected in step 816, the playbook automation system 200 can then present a user 108 with a group selection, in step 820. Group selections can include but are not limited to the group characterizations described in conjunction with FIG. 3, positions 310-346 in data structure 300. Among other things, these grouping can include for example, formations, plays, progressions, and personnel groupings as selection options.

Using the mode selection, the playbook automation system 200, can retrieve the corresponding simulation based at least in part on the user selections in step 824. Step 828, provides a presentation of the simulation requested and the user 108 can commence the actual simulation. Additionally or alternatively the user 108 can be provided with the option of selecting the presentation method. That is, for example, a user 108 who has selected testing mode, with formations as a grouping, can then designate if a video clip, a voice recording and or user manual interaction would be the best training tool for presentation.

Upon completion of the selected simulation, or intermittently, user inputs will be stored in step 832. This data storage can occur in a memory within the user device 104, data structure 300, or stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Once a user 108 has completed the selected simulation, the user 108 can be presented with the option to retake the quiz, for example, or start a new simulation. If it is determined that the person would like to start a new simulation, method 800 proceeds YES to step 814. In step 814, as previously described, the playbook automation system 200, will provide the user with the opportunity to select the mode it wishes to use, followed by a group selection in step 816. If is determined that the person is done, and would like to terminate simulation, the method 800 proceeds to NO to step 840. In step 840, the stored user inputs collected in step 832 are sent to the appropriate sports personnel. For example, if the player was using the testing simulation, and the player was quizzed on progressions, formations and run plays, this information and appropriate scores are presented to the coach. The data collected can be presented in the form of a score card as previously described and in conjunction with FIG. 7.

As discussed above, each player on a team may be provided with different questions or perspectives from the same playbook data based on that user's position. For example, the quarterback may be taught and tested on all aspects of offensive plays in the playbook database 108. On the other hand, it may not be necessary to test a running back's knowledge of "in the huddle" the same way that a quarterback is tested. Similarly, it may not be necessary to test a lineman's knowledge of routes. Accordingly, the teaching and testing steps described herein are only some examples of the types of teaching and testing methods that may be employed accordance with embodiments of the present disclosure.

In some embodiments, the teaching/testing methods described herein may also be employed to develop scouting reports for players entering a new league (e.g., NFL rookies during the scouting combine). Rather than using a Wonderlic™ test to simply test a player's intellect, it may be useful to actually test playbook knowledge to get a better gauge of what a team is likely to draft and invest in. In some embodiments, the playbook database 108 may be provided with a predetermined number of set plays (perhaps specific to a particular team or perhaps generic to a plurality of teams). A draft eligible player would be given a predetermined amount of time to study a predetermined number of randomly selected plays, as an example, say 15 of plays and 15 minutes to study them. After the study time is up, the player would then be required to draw those plays with a drawing tool made available by the playbook testing module 120. Results would be sent out to all of the teams just like the Wonderlic test. This particular type of testing process can be more efficient and comparable in length (time) to the other tests currently employed during scouting. Furthermore, each player's ability to learn a playbook could be comparatively tested, thereby providing a team with the ability to identify which among the plurality of draft eligible players are going to be able to learn the playbook more efficiently and effectively.

Embodiments of the present disclosure are particularly useful in helping players develop efficient study habits as well as providing immediate feedback regarding the correctness of answers to questions presented to the user.

In the foregoing description, for the purposes of illustration, methods were described in a particular order. It should be appreciated that in alternate embodiments, the methods and steps thereof may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently, in addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method for teaching playbook content comprising;
  receiving, at a processing device, a first user input from a first user device identifying a first user of the first user device based in part on the first user input,
  determining, at the processing device, that the first user belongs to a first user group selected based, at least in part, on a football position played by the first user,
  retrieving, from a playbook database, a set of plays and corresponding player responsibilities for each play in the set of plays, wherein the set of plays and the corresponding player responsibilities are selected from the playbook database for the first user based on the football position played by the first user,
  receiving, at the processing device, a second user input from a second user device identifying a second user of the second user device based in part on the second user input,
  determining, at the processing device, that the second user belongs to a second user group selected based, at least in part, on a football position played by the second user, wherein the first user group is different from the second user group and the football position played by the second user is different from the football position played by the first user,
  retrieving, from the playbook database, the set of plays and corresponding player responsibilities for each play in the set of plays, wherein the set of plays selected for the second user is the same as the set of plays selected for the first user and the corresponding player responsibilities are selected from the playbook database for the second user based on the football position played by the second user, which is different from the first user,
  presenting the first user with one of a plurality of playbook simulation modes for selection,
  presenting the first user with one of a plurality of play groups for selection based at least in part on the selection of the playbook simulation mode,
  providing the first user with at least one of a plurality of simulations based at least in part on the selection of the play group, wherein the first user is provided with at least one of a video recording and an audio recording in which a selected play is called,
  receiving the first player's voice response, wherein the first player's voice response corresponds to the first player calling out the selected play,
  comparing the first player's voice response with a name of the selected play,
  determining, based on the comparison, an accuracy of the first player calling out the name of the selected play,
  visually presenting the first player with feedback that describes the accuracy of the first player calling out the name of the selected play, wherein the feedback that describes the accuracy of the first player calling out the name of the selected play comprises at least one of a highlight, underline, circle, and delineation of incorrect wording received in the first player's voice response, presenting the second user with one of a plurality of playbook simulation modes for selection, presenting the second user with one of a plurality of play groups for selection based at least in part on the selection of the playbook simulation mode, providing the second user with at least one of a plurality of simulations based at least in part on the selection of the play group, storing, in a memory, the information associated with the simulation presented and the first and second users, and sending at least a third user the information associated with the simulation presented.

2. The method of claim 1, wherein the playbook simulation modes include at least one of a testing mode, a playbook mode and an installation mode.

3. The method of claim 2, wherein the testing mode comprises at least one of a plurality of simulations which can test the first user on playbook content based on the position played by the first user and wherein the testing mode comprises at least one of a plurality of simulations which can test the second user on playbook content based on the position played by the second user, wherein the first user and second user are presented with different tests for a common play from the set of plays.

4. The method of claim 3, wherein the testing mode further comprises providing the first user with a first question about a first aspect of a first play.

5. The method of claim 4, wherein the first aspect of the first play comprises personnel and wherein the second aspect of the first play comprises at least one of formations, routes, protections, check-downs, defensive recognition, and "in the huddle."

6. The method of claim 2, wherein the playbook mode comprises the at least one of a plurality of simulations which can teach the first user playbook content based at least partly on the play group selection entered.

7. The method of claim 6, wherein the playbook mode further includes a visual presentation of a play call or an audible presentation of a play call.

8. The method of claim 2, wherein the installation mode comprises at least one of a plurality of simulations that enables the third user to create and tailor a plurality of sports plays based at least partly on the group selection.

9. The method of claim 7, wherein the sports play can be taught and projected during a meeting between the third user and at least the first or second user.

10. The method of claim 2, wherein the first user and the second user are both presented with the simulations via a web-based document transmitted between the processing device and the first and second user devices.

11. A playbook automation system, comprising;
a memory;
a processor;
a playbook generation module operating at a web-based processing device, the playbook generation module enabling the processing device to:
  receive a first user input from a first user device and identify a first user of the first user device based in part on the first user input;
  determine that the first user belongs to a first user group selected based, at least in part, on a football position played by the first user;
  retrieving, from a playbook database, a set of plays and corresponding player responsibilities for each play in the set of plays, wherein the set of plays and the corresponding player responsibilities are selected from the playbook database for the first user based on the football position played by the first user;
  receive a second user input from a second user device identifying a second user of the second user device based in part on the second user input;
  determine that the second user belongs to a second user group selected based, at least in part, on a football position played by the second user, wherein the first user group is different from the second user group and the football position played by the second user is different from the football position played by the first user;
  retrieve, from the playbook database, the set of plays and corresponding player responsibilities for each play in the set of plays, wherein the set of plays selected for the second user is the same as the set of plays selected for the first user and the corresponding player responsibilities are selected from the playbook database for the second user based on the football position played by the second user, which is different from the first user;
  present the first user with one of a plurality of playbook simulation modes for selection;
  present the first user with one of a plurality of play groups for selection based at least in part on the playbook simulation mode selection;
  provide the first user with at least one of a plurality of simulations based at least in part on the play group selection, wherein the first user is provided with at least one of a video recording and an audio recording in which a selected play is called;
  receive the first player's voice response, wherein the first player's voice response corresponds to the first player calling out the selected play;
  compare the first player's voice response with a name of the selected play;
  determine, based on the comparison, a word count accuracy of the first player calling out the name of the selected play;
  visually present the first player with feedback that describes the word count accuracy of the first player calling out the name of the selected play;
  present the second user with one of a plurality of playbook simulation modes for selection;
  present the second user with one of a plurality of play groups for selection based at least in part on the selection of the playbook simulation mode;
  provide the second user with at least one of a plurality of simulations based at least in part on the selection of the play group;
  store, in the memory, the information associated with the simulation presented and the first and second users; and
  send at least a third user the information associated with the simulation presented.

12. The playbook automation system of claim 11, wherein the playbook simulation modes include at least one of a testing mode, a playbook mode and an installation mode.

13. The playbook automation system of claim 12, wherein the testing mode comprises at least one of a plurality of simulations which can test the first user on playbook content based on the position played by the first user and wherein the testing mode comprises at least one of a plurality of simulations which can test the second user on playbook content based on the position played by the second user, wherein the first user and second user are presented with different tests for a common play from the set of plays.

14. The playbook automation system of claim 13, wherein the testing mode further comprises providing the first user with a first question about a first aspect of a first play.

15. The playbook automation system of claim 12, wherein the installation mode comprises at least one of a plurality of simulation environments that enables a second user to create and tailor a plurality of sports plays based at least partly on the group selection.

16. A non-transitory computer readable medium having instructions stored thereon that, when executed by a processor, perform a method comprising:
receiving, at the processor, a first user input from a first user device identifying a first user of the first user device based in part on the first user input;
determining, at the processing device, that the first user belongs to a first user group selected based, at least in part, on a football position played by the first user;
retrieving, from a playbook database, a set of plays and corresponding player responsibilities for each play in the set of plays, wherein the set of plays and the corresponding player responsibilities are selected from the playbook database for the first user based on the football position played by the first user;
receiving, at the processing device, a second user input from a second user device identifying a second user of the second user device based in part on the second user input;
determining, at the processing device, that the second user belongs to a second user group selected based, at least in part, on a football position played by the second user, wherein the first user group is different from the second user group and the football position played by the second user is different from the football position played by the first user, and wherein the first user group corresponds to a quarterback user group;
retrieving, from the playbook database, the set of plays and corresponding player responsibilities for each play in the set of plays, wherein the set of plays selected for the second user is the same as the set of plays selected for the first user and the corresponding player responsibilities are selected from the playbook database for the second user based on the football position played by the second user, which is different from the first user;
presenting the first user with one of a plurality of playbook simulation modes for selection;
presenting the first user with one of a plurality of play groups for selection based at least in part on the selection of the playbook simulation mode;
providing the first user with at least one of a plurality of simulations based at least in part on the selection of the play group, wherein the first user is provided with at least one of a video recording and an audio recording in which a selected play is provided;
receiving the first player's voice response, wherein the first player's voice response corresponds to the first player audibly calling out the selected play;
comparing the first player's voice response with a name of the selected play;
determining, based on the comparison, an accuracy of the first player audibly, calling out the name of the selected play;
visually presenting the first player with feedback that describes the accuracy of the first player audibly calling out the name of the selected play, wherein the feedback that describes the accuracy of the first player audibly calling out the name of the selected play comprises at least one of a highlight, underline, circle, and delineation of incorrect wording received in the first player's voice response;
presenting the second user with one of a plurality of playbook simulation modes for selection,
presenting the second user with one of a plurality of play groups for selection based at least in part on the selection of the playbook simulation mode,
providing the second user with at least one of a plurality of simulations based at least in part on the selection of the play group,
storing, in a memory, the information associated with the simulation presented and the first and second users; and
sending at least a third user the information associated with the simulation presented.

17. A non-transitory computer readable medium of claim 16, wherein the playbook simulation modes include at least one of a testing mode, a playbook mode and an installation mode.

18. A non-transitory computer readable medium of claim 17, wherein the playbook mode comprises at least one of a plurality of simulations which can teach the first user playbook content based on the position played by the first user and wherein the testing mode comprises at least one of a plurality of simulations which can test the second user on playbook content based on the position played by the second user, wherein the first user and second user are presented with different tests for a common play from the set of plays.

19. A non-transitory computer readable medium of claim 18, wherein the playbook mode further includes a visual presentation of a play call or an audible presentation of a play call.

20. A non-transitory computer readable medium of claim 19, wherein the first user and the second user are both presented with the simulations via a web-based document transmitted between the processing device and the first and second user devices.

* * * * *